United States Patent Office 2,843,238
Patented July 15, 1958

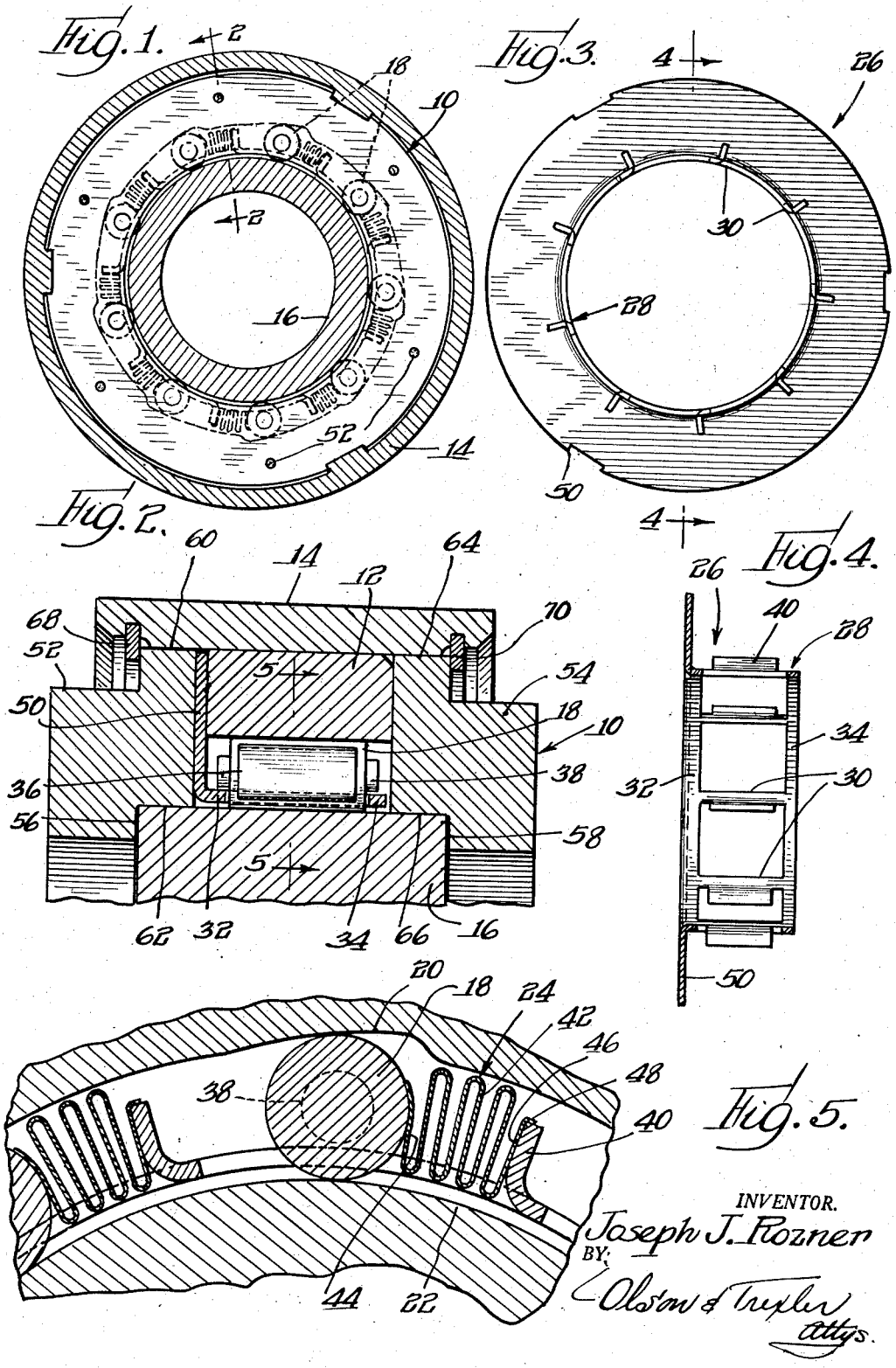

2,843,238

ONE-WAY CLUTCH

Joseph J. Rozner, Chicago, Ill., assignor to Parkersburg-Aetna Corporation, Chicago, Ill., a corporation of West Virginia Application November 23, 1955, Serial No. 548,621

10 Claims. (Cl. 192—45)

The present invention relates to a novel clutch structure, and more particularly to a novel one-way clutch.

Various one-way clutches including inner and outer races, and wedging elements between the races have heretofore been provided. Such clutches also frequently include spring elements for biasing the wedging elements into locking engagement with the inner and outer races. Frequently considerable difficulty is encountered in assembling the various elements of such prior clutch mechanisms so that a considerable amount of time and labor is expended. This problem is accentuated when the clutch mechanism is to be installed in an apparatus or machine constructed so that it is either desirable or necessary to assemble the various elements of the clutch mechanism with each other during installation of the mechanism in the apparatus or machine.

An important object of the present invention is to provide a novel one-way clutch mechanism having inner and outer race or body members and a plurality of wedging elements therebetween, which mechanism is constructed so as to facilitate assembly of the various elements thereof.

A more specific object of the present invention is to provide a novel clutch mechanism of the above described type which is constructed so that the wedging elements and spring means for biasing the wedging elements may be easily and economically preassembled with one of the race or body members so as to facilitate subsequent assembly of the other race or body member and/or installation of the clutch mechanism in various apparatus or machines.

A still more specific object of the present invention is to provide a novel one-way clutch mechanism wherein a plurality of wedging elements and a plurality of spring means for biasing the wedging elements may be assembled as a unit, which unit may be easily secured in preassembled relationship with a race or body member.

Other objects and advantages of the present invention will become apparent from the following description and the accompanying drawings, wherein:

Fig. 1 is a sectional view showing a clutch mechanism incorporating the features of the present invention;

Fig. 2 is an enlarged fragmentary sectional view taken along line 2—2 in Fig. 1;

Fig. 3 is an elevational view showing a novel cage or retainer member incorporated in the clutch mechanism of this invention;

Fig. 4 is a sectional view taken along line 4—4 in Fig. 3; and

Fig. 5 is an enlarged fragmentary sectional view taken along line 5—5 in Fig. 2.

Referring now more specifically to the drawings wherein like parts are designated by the same numerals throughout the various figures, a one-way clutch mechanism 10 is shown for the purpose of illustrating this invention. One practical application for the one-way clutch mechanism is found in the automotive industry wherein the clutch mechanism may be installed in torque converters. However, various other uses for the clutch mechanism of this invention will readily suggest themselves.

The clutch mechanism 10 comprises an outer annular race or body member 12 adapted to be connected to a member 14 of an apparatus in which the clutch is installed. An inner race or body member 16 is concentrically disposed within the outer race, which inner race may be connected with a shaft or the like, not shown, of the apparatus in which the clutch is installed. A plurality of rollers 18 is disposed between the inner and outer race or body members, which rollers are adapted to wedge between the inner race member and cam surface sections 20 formed on the inner wall of the outer race and converging toward radially aligned sections of the inner race member surface 22. Spring elements 24 are provided for biasing the rollers or wedging elements toward locking engagement with the race or body members.

In accordance with the feature of the present invention the clutch mechanism is provided with a novel cage or retaining member 26 in which the rollers and spring elements may be easily assembled to provide a unit that may be readily conencted with the outer race or body member in preassembled relationship. More specifically, the cage member 26 includes a cylindrical portion 28 having a plurality of circumferentially spaced openings 30 therein. The openings are formed entirely within the margins of the cylindrical portion 28 so that opposite sides of the openings are closed by continuous annular end portions 32 and 34 of the cylindrical portion. One of the rollers or wedging elements 18 is disposed in each of the openings 30, and each roller includes axially extending protuberances 36 and 38, respectively, projecting over the end portions 32 and 34 to prevent the rollers from passing through the openings. The continuous annular end portions 32 and 34 also provide means engageable with the opposite ends of the rollers for preventing lateral displacement of the rollers. It should be noted that the diameters of the rollers, the protuberances 36 and 38, the inner race or body member and the cylindrical cage portion 28 are such that when the clutch mechanism is fully assembled, the rollers are lifted by the inner race member sufficiently to prevent the protuberances 36 and 38 from engaging and placing a stress on the relatively narrow end portions 32 and 34 of the cage member. Portions of the material struck from the cylindrical cage portion 28 during the formation of the openings 30 are bent radially outwardly to provide tabs 40 or abutments cooperable with the spring elements 24. Each of the spring elements is preferably formed from a relatively broad strip of sheet spring steel and is provided with a plurality of undulations 42 between opposite end portions 44 and 46. The end portion 44 of each spring terminates in a section which is curved to conform with an associated roller and which extends so that it is trapped between the roller and the outer race or body member. Each of the end portions 46 terminates in a short flange 48 which overlies its associated abutment 40 so that this end of the spring is also trapped whereby unauthorized passage of the spring through its associated opening 30 in the cage is precluded. It should be noted that the length of the spring undulations 42 is slightly greater than the difference between the radius of the cage portion 28 outer surface and the radius of the race member 12 inner wall. Thus the radially inner ends of the undulations 42 project into the associated opening 30 as shown best in Fig. 5, and the end portions 32 and 34 of the cage member provide means for preventing lateral displacement of the springs.

The cage member 26 includes a radially extending flange 50 which is adapted to extend along one end of the race or body member 12. After the unit including the cage member, the rollers and springs has been assembled with the outer race or body member, the flange 50 is is secured to the outer race by suitable means. Preferably the flange 50 is secured to the outer race by a plurality of spot welds 52 so that the cage, rollers, springs and outer race are permanently secured in preassembled relationship.

The inner race or body member 16 may be assembled within the preassembled unit comprising the outer race, cage, rollers and springs easily and at any convenient time and location. In the embodiment shown the inner race or body member is concentrically located within the outer race and retained by means of a pair of annular spacing blocks 52 and 54 which respectively abut against the cage flange 50 and an opposite end of the outer race 12 and also have shoulders 56 and 58, respectively, confining opposite ends of the inner race member. The spacing block 52 is provided with concentric outer and inner surfaces 60 and 62, respectively, engageable with the member 14 and the inner race member for concentrically locating the inner race member with respect to the member 14 and thus the outer race member, and the spacing block 54 is provided with similar surfaces 64 and 66. The spacing and retaining blocks 52 and 54 are, respectively, held in assembled relationship by suitable means such as snap rings 68 and 70 fitting within grooves formed in the member 14.

While the preferred embodiment of the present invention has been shown and described herein, it is obvious that many structural details may be changed without departing from the spirit and scope of the appended claims.

The invention is claimed as follows:

1. In a one-way clutch comprising outer annular body means, inner body means disposed within said outer body means, and wedging means disposed between said inner and outer body means, a preassembled unit including a body means, a one-piece sheet material retaining member having radially extending flange means secured to said last mentioned body means and having an axially extending portion radially aligned with and spaced from said last mentioned body means, said retaining member including an abutment, said retaining member portion having an opening therethrough substantially completely surrounded by margins of said portion, a wedging element loosely trapped between said last mentioned body means and margins of said retaining member portion and projecting through said opening for preventing radial and lateral separation of the wedging element from said body means, and spring means disposed between and engaging said wedging element and said abutment for yieldably biasing said wedging element.

2. In a one-way clutch comprising outer and inner body means, and wedging means therebetween, a preassembled unit including body means, a sheet material retaining member having radial flange means secured to said last mentioned body means and having an axially extending portion radially aligned with and spaced from said body means, said retaining member portion having an opening therethrough substantially entirely surrounded by margins of said portion and including an abutment, a wedging element projecting through said opening and including protuberance means disposed between margins of said retaining member portion and said last mentioned body means for preventing the wedging element from passing through said opening, and compression spring means disposed between and engaging said wedging element and said abutment for biasing said element, said spring means including opposite end portions respectively disposed between said last mentioned body means and said wedging element and said abutment for preventing the spring means from passing through said opening.

3. A one-way clutch comprising annular outer body means, a retaining member including radially extending flange means secured to said outer body means and an axially extending cylindrical portion disposed within said outer body means, said cylindrical portion having a plurality of circumferentially spaced openings therethrough between substantially continuous opposite end sections thereof, said retaining member including a plurality of abutments respectively disposed adjacent ends of each of said openings, inner body means disposed within said outer body means, a plurality of wedging elements respectively disposed in said openings for simultaneously engaging surfaces of said inner and outer body means and having portions overlying said continuous end sections to prevent the rollers from passing through the openings, and a plurality of undulated sheet material spring elements respectively disposed between and engaging each roller element and an adjacent abutment for biasing said roller elements against said surfaces, each of said spring elements having a portion projecting into an opening for preventing lateral displacement of the spring elements, and each of said spring elements including opposite end sections respectively at least partially overlying its associated roller element and abutment for preventing the spring elements from passing through the openings.

4. In a one-way clutch structure of the type including inner and outer race members and wedging means disposed between the race members, a preassembled unit comprising a race member, a retaining member having a radially extending portion secured to said last mentioned race member and having a generally axially extending portion substantially radially aligned with a bearing surface of said last mentioned race member, said axially extending portion having an opening therethrough substantially enclosed by margins thereof, a wedging element having portions trapped between said race member and margins of said axially extending portion and having a portion projecting through said opening, an abutment on one of said members adjacent said opening, and a spring traversing said opening between said wedging element and said abutment and yieldably biasing said wedging element and having opposite ends respectively disposed between said last mentioned race member and said wedging element and said abutment for preventing the spring from passing through said opening, and one of said members including means for preventing lateral displacement of said spring.

5. In a one-way clutch structure a preassembled unit comprising an annular body member, a retaining member having a first portion secured to said annular body member and having a second portion disposed within and radially spaced from and traversing said body member, said second portion having an opening therethrough substantially completely within boundaries thereof, a wedging element projecting through said opening and having means disposed between said body member and said portion for preventing the wedging element from passing through said opening, an abutment on one of said members adjacent said opening, and a spring traversing said opening and having opposite ends engaging said abutment and said wedging element for yieldably biasing said wedging element, said opposite spring ends respectively terminating in sections disposed between said body member and said wedging element and said abutment for preventing the spring from passing through said opening, and one of said members including means laterally outwardly of said spring for preventing lateral displacement of the spring.

6. In a one-way clutch structure, a preassembled unit comprising a body member, a retaining member secured to and having a portion radially aligned with an annular surface of said body member, said portion having an opening therethrough, a wedging element projecting through said opening and having means disposed between said body member and said portion for preventing the wedging element from passing through said opening, an abutment on one of said members adjacent said opening, and a spring having opposite ends engaging said abutment and said wedging element for yieldably biasing said wedging element, said opposite spring ends respectively terminating in sections disposed between said body member and said wedging element and said abutment for preventing the spring from passing through said opening, one of said members including means for preventing lateral displacement of the spring, said spring including a portion projecting into said opening, and said means for preventing lateral displacement of the spring comprising portions of said retaining member defining opposite sides of said opening and engageable with said spring portion.

7. In a one-way clutch structure a preassembled unit comprising an annular body member, a retaining member having a radially projecting portion secured to said body member adjacent one end of an interior annular bearing surface of the body member and having a second portion disposed within said body member and extending axially from said first mentioned portion, said second retaining member portion having an opening therethrough defined on opposite sides by substantially continuous sections of said second portion, a roller element disposed between said body member and said second portion and projecting through said opening, said roller element including opposite end protuberances overlying said sections for preventing the roller element from passing through said opening, an abutment on one of said members adjacent said opening, and a sheet material spring traversing said opening and disposed between said abutment and said roller for yieldably biasing said roller, said spring having a width similar to a length of the roller projecting through said opening and said spring engaging said roller along a major portion of said length.

8. In a one-way clutch structure a preassembled unit comprising a body member having an annular bearing surface, a retaining member having radially projecting means secured to said body member and having a cylindrical portion extending axially from said radially projecting means and traversing said body member surface in radially spaced relationship thereto, said cylindrical portion having a plurality of circumferentially spaced openings therethrough between substantially continuous opposite end sections thereof, and a plurality of rollers disposed between said cylindrical portion and said body member surface and respectively projecting through said openings, said rollers including opposite end protuberances extending between said opposite end sections and said body member surface for preventing said rollers from passing through the openings.

9. A preassembled unit, as defined in claim 8, which includes a plurality of abutments struck from said cylindrical portion adjacent an end of each of said openings, and a plurality of springs respectively disposed between each abutment and an adjacent roller for yieldably biasing the rollers.

10. A preassembled unit, as defined in claim 9, wherein each of said springs is of sheet material and includes an undulation extending from said body member into an associated opening and engageable with the end sections defining said opening for preventing lateral displacement of the spring, and wherein each spring includes opposite end sections respectively disposed between said body member and an associated roller element and abutment for preventing the spring from passing through said opening.

References Cited in the file of this patent

UNITED STATES PATENTS

| | | |
|---|---|---|
| 1,708,215 | Chryst | Apr. 9, 1929 |
| 1,927,046 | Powell | Sept. 19, 1933 |
| 2,154,212 | Moorhouse | Apr. 11, 1939 |
| 2,172,653 | Flogaus | Sept. 12, 1939 |
| 2,393,693 | Kelbel | Jan. 29, 1946 |
| 2,633,951 | Ayer et al. | Apr. 7, 1953 |